(12) United States Patent
Lo

(10) Patent No.: US 8,704,995 B2
(45) Date of Patent: Apr. 22, 2014

(54) LIQUID CRYSTAL DISPLAY DEVICE, PANEL AND PANEL MANUFACTURE METHOD THEREOF

(75) Inventor: Shih-Hsun Lo, Guandong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 118 days.

(21) Appl. No.: 13/574,601

(22) PCT Filed: Jun. 12, 2012

(86) PCT No.: PCT/CN2012/076759
§ 371 (c)(1),
(2), (4) Date: Jul. 21, 2012

(87) PCT Pub. No.: WO2013/177825
PCT Pub. Date: Dec. 5, 2013

(65) Prior Publication Data
US 2013/0321731 A1 Dec. 5, 2013

(51) Int. Cl.
*G02F 1/1339* (2006.01)

(52) U.S. Cl.
USPC .......................................... 349/190

(58) Field of Classification Search
USPC .......................................... 349/190
See application file for complete search history.

*Primary Examiner* — Phu Vu
(74) *Attorney, Agent, or Firm* — Andrew C. Cheng

(57) ABSTRACT

The present invention provides a panel and panel manufacture method, including: completing thin film transistor array and common electrode on glass substrate, forming adjacent substrate pair, adjacent substrate pair including first substrate and second substrate connected by adjacent line, common electrodes on first substrate and second substrate symmetrically distributed with respect to adjacent line; coating a first seal on peripheral area of adjacent substrate pair, coating a second seal along adjacent sides of first substrate and second substrate, second seal and first seal being partially overlapping, at least one of first seal and second seal including conductive particles; boxing adjacent substrate pair and filter substrate pair so that conductive particles conducting common electrodes of adjacent substrate pair and filter substrate pair; cutting adjacent substrate pair and filter substrate pair along adjacent lines to form panel. The present invention also provides a liquid crystal display panel.

18 Claims, 5 Drawing Sheets

LIQUID CRYSTAL DISPLAY DEVICE, PANEL AND PANEL MANUFACTURE METHOD THEREOF

BACKGROUND OF THE INVENTION

1. Field of the Invention

The present invention relates to the field of liquid crystal displaying techniques, and in particular to a liquid crystal display device, panel and panel manufacture method thereof.

2. The Related Arts

In general, TFT-LCD requires Au in sealant or additional transfer pad to connect the common electrode Vcom in upper and lower substrates. However, the processing of applying additional transfer pad is more difficult, and Au in sealant has a restriction of requiring equal voltage level in coated area of upper and lower substrates. FIG. 1 shows a schematic view of a coating structure of seal 20 of substrate 10 in known technique. Because coating technique determines that seal 20 must be designed as independent and closed pattern, it is a difficult task to apply transfer pad or Au in sealant on Vcom while other areas using general seal coating.

SUMMARY OF THE INVENTION

The technical issue to be addressed by the present invention is to provide a liquid crystal display device, panel and panel manufacture method, to avoid complex process of transfer pad as well as solve the problem of applying transfer pad or Au in sealant on Vcom while other areas using general seal coating.

The present invention provides a panel manufacture method, which comprises: completing thin film transistor array and common electrode (Vcom) on glass substrate, forming adjacent substrate pair, the adjacent substrate pair comprising a first substrate and a second substrate connected by adjacent lines, Vcom on the first substrate and the second substrate being symmetrically distributed with respect to adjacent line; coating a first seal on peripheral area of adjacent substrate pair, coating a second seal along the adjacent sides of the first substrate and the second substrate, the second seal and the first seal being partially overlapping, at least one of the first seal and the second seal comprising conductive particles; boxing the adjacent substrate pair and filter substrate pair so that conductive particles conducting common electrodes of adjacent substrate pair and filter substrate pair; cutting adjacent substrate pair and filter substrate pair along adjacent lines of first substrate and second substrate to form panel.

According to a preferred embodiment of the present invention, when the common electrode are disposed on adjacent sides of first substrate and second substrate, only second seal is doped with conductive particles and second seal at least partially covers common electrodes.

According to a preferred embodiment of the present invention, when the common electrodes are disposed on peripheral areas surrounding adjacent substrate pair, only the first seal is doped with conductive particles and first seal at least partially covers common electrodes.

According to a preferred embodiment of the present invention, the conductive particle is gold particle (Au).

According to a preferred embodiment of the present invention, number of conductive particles is plural and diameters of conductive particles are different.

According to a preferred embodiment of the present invention, the width of the first seal is different width of the second seal.

The present invention provides a panel manufactured by aforementioned panel manufacture method, which comprises: a thin film transistor substrate, being one of first substrate or second substrate; a filter substrate, being one of filter substrate pair; first seal part, a part of first seal, coating on borders of first, second and third sides of thin film transistor substrate; second seal part, a part of second seal, coating on border of fourth side of thin film transistor substrate, first seal part and second seal part being partially crossing and overlapping.

According to a preferred embodiment of the present invention, border of the fourth side of thin film transistor substrate is disposed with common electrodes, only second seal part is doped with conductive particles and second seal part at least partially covers the common electrodes.

According to a preferred embodiment of the present invention, borders of the first, second and third sides of thin film transistor substrate are disposed with common electrodes, only first seal part is doped with conductive particles and first seal part at least partially covers the common electrodes.

According to a preferred embodiment of the present invention, the conductive particle is gold particle (Au).

According to a preferred embodiment of the present invention, number of conductive particles is plural and diameters of conductive particles are different.

According to a preferred embodiment of the present invention, the width of the first seal is different width of the second seal.

The present invention provides a liquid crystal display device, which comprises: a thin film transistor substrate, being one of first substrate or second substrate; a filter substrate, being one of filter substrate pair; first seal part, a part of first seal, coating on borders of first, second and third sides of thin film transistor substrate; second seal part, a part of second seal, coating on border of fourth side of thin film transistor substrate, first seal part and second seal part being partially crossing and overlapping.

According to a preferred embodiment of the present invention, border of the fourth side of thin film transistor substrate is disposed with common electrodes, only second seal part is doped with conductive particles and second seal part at least partially covers the common electrodes.

According to a preferred embodiment of the present invention, borders of the first, second and third sides of thin film transistor substrate are disposed with common electrodes, only first seal part is doped with conductive particles and first seal part at least partially covers the common electrodes.

According to a preferred embodiment of the present invention, the conductive particle is gold particle (Au).

According to a preferred embodiment of the present invention, number of conductive particles is plural and diameters of conductive particles are different.

According to a preferred embodiment of the present invention, the width of the first seal is different width of the second seal.

The efficacy of the present invention is that to be distinguished from the state of the art. The liquid crystal display device, panel and panel manufacture method thereof coat the common electrode area of adjacent substrate pair with a seal doped with conductive particles, and remaining area with general seal. Through adjacent substrate pair to realize sealing coating of the seal, the panel forms different seals on different sides after cutting. The seal doped with conductive particle of the panel of the present invention can conduct common electrodes of the upper and lower substrates, and remaining area other than common electrode is coated with a general seal without conductive particles.

DETAILED DESCRIPTION OF THE PREFERRED EMBODIMENTS

Figure 1:
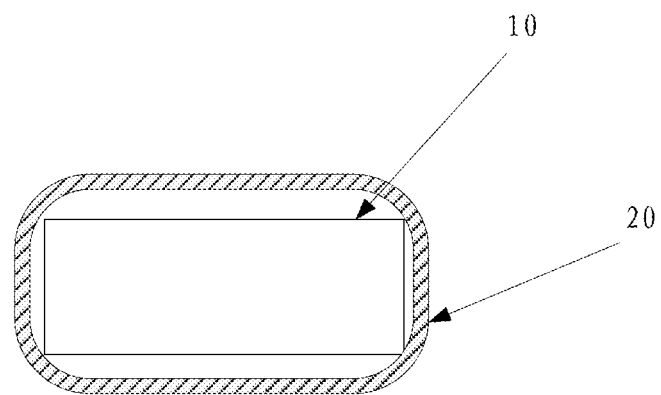
FIG. 1 is a schematic view showing the structure of a known substrate seal coating.
Figure 2:
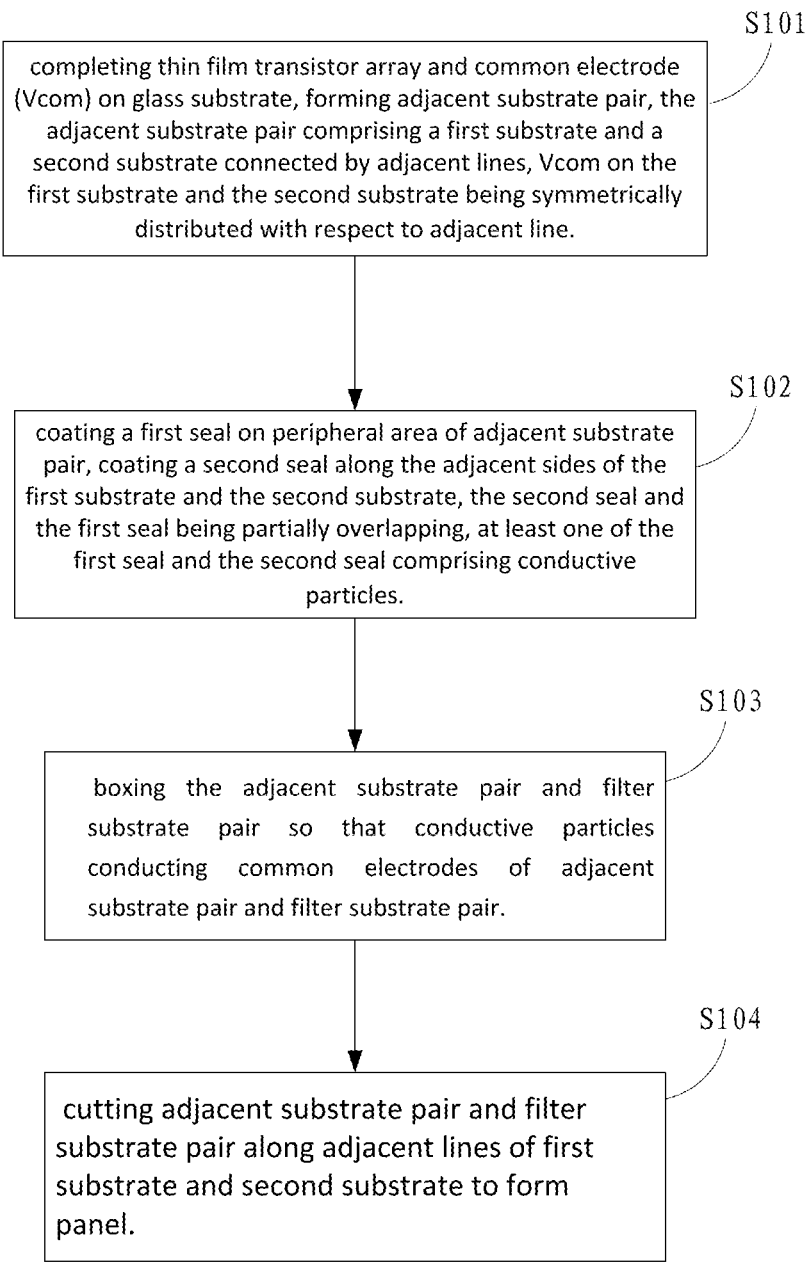
FIG. 2 is a flowchart of the panel manufacture method according to the present invention.
Figure 3:
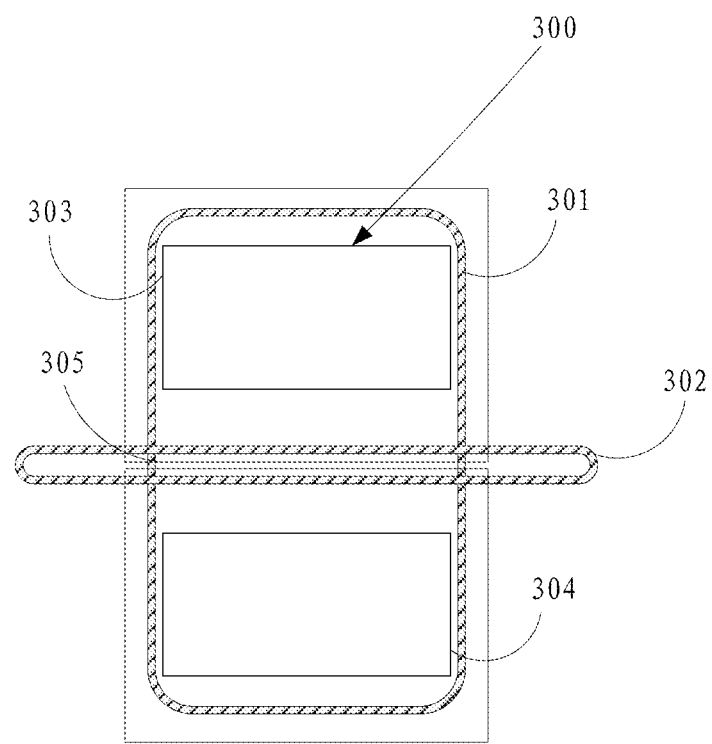
FIG. 3 is a schematic view showing the structure of a seal coating of adjacent substrate pair prior to forming the panel according to the present invention.

The embodiments according to the present invention with respect to drawings that are necessary for the illustration of the embodiments will be given as follows. Apparently, the drawings described below show only example embodiments of the present invention and for those having ordinary skills in the art, other drawings may be easily obtained from these drawings without paying any creative effort.

Refer to FIG. 2, FIG. 3, FIG. 4, FIG. 5A and FIG. 5B. The panel manufacture method of the present invention comprises the steps of:

Step S101: completing thin film transistor array and common electrode (Vcom) on glass substrate, forming adjacent substrate pair, the adjacent substrate pair comprising a first substrate and a second substrate connected by adjacent lines, Vcom on the first substrate and the second substrate being symmetrically distributed with respect to adjacent line.

In this step of the instant embodiment, technique of forming thin film transistor array and common electrode is similar to the known technique. The difference is in forming adjacent substrate pair 300 on glass substrate. Adjacent substrate pair 300 comprises first substrate 303 and second substrate 304, connected adjacently by adjacent line 305. As such, adjacent substrate pair 300 can be used as a unit for coating closed seal. The following will describe that, after coating seal, adjacent substrate pair 300 needs to be cut into two independent substrates.

It should be noted that common electrodes 401 on first substrate 303 and second substrate 304 need to be symmetrically distributed with respect to adjacent line 305. As such, when a seal symmetrically coats along adjacent line 305 on adjacent substrate 300, the seal is likely to symmetrically covers common electrodes 401 on first substrate 303 and second substrate 304. Specifically, common electrodes 401 can be disposed on adjacent sides of first substrate 303 and second substrate 304. The adjacent side refers to a side on first substrate 303 and second substrate 304 respectively close to adjacent line 305. Common electrodes 401 can be disposed on peripheral area surrounding adjacent substrate pair 300. The only requirement is to have common electrodes 401 on first substrate 303 and second substrate 304 symmetrically distributed with respect to adjacent line 305.

The instant embodiment uses an adjacent substrate pair 300 as exemplar for description but is not restricted to the exemplar. In large-size panel technique, a plurality of adjacent substrate pairs 300 can be formed on glass substrate in an array form for subsequent process.

Step S102: coating a first seal on peripheral area of adjacent substrate pair, coating a second seal along the adjacent sides of the first substrate and the second substrate, the second seal and the first seal being partially overlapping, at least one of the first seal and the second seal comprising conductive particles.

In the instant embodiment, first seal 301 and second seal 302 are used to coat symmetrically disposed first substrate 303 and second substrate 304 so that first seal 301 and second seal 302 are both closed seal, and are symmetrically with respect to adjacent line 305.

In the instant embodiment, because adjacent sides of first substrate 303 and second substrate 304 are disposed with common electrodes 401, second seal 302 can be doped with conductive particles 403 and second seal 302 is at least partially covering common electrodes 401 of adjacent substrate pair 300. Because adjacent substrate pair 300 corresponding to first seal 301 is not disposed with common electrodes 401 on the peripheral, first seal 301 is not doped with conductive particles.

The instant embodiment uses two seals, coats area disposed with common electrodes 401 with second seal 302 doped with conductive particles and coats area not disposed with common electrodes 401 with first seal 301 not doped with conductive particles so that adjacent substrate pair 300 realizes closed coating of the seal. After cutting, peripheral area of panel forms different types of seals to conduct common electrodes of upper and lower substrates.

In other embodiments, when common electrodes 401 are disposed in peripheral area surrounding adjacent substrate 300, only first seal 301 is doped with conductive particles and first seal 301 at least partially covers common electrodes 401.

In other embodiments, width of seals can be changed so that first seal 301 and second seal 302 have different widths to reduce cost and improve coating efficiency.

It should be noted that the order of coating first seal 301 and second seal 302 does not affect the effect of coating process, and the order is determined by the manufacture process. After coating, first seal 301 and second seal 302 are partially overlapping.

Step S103: boxing the adjacent substrate pair and filter substrate pair so that conductive particles conducting common electrodes of adjacent substrate pair and filter substrate pair.

In the instant embodiment, adjacent substrate pair 300 and filter substrate pair (not shown) are connected through first seal 301 and second seal 302 coating on adjacent substrate 300. Upper surface of conductive particles 403 is in contact with common electrodes 402 on filter substrate pair, and lower surface of conductive particles 403 is in contact with common electrodes 401 on adjacent substrate pair 300. Common electrodes 401 on adjacent substrate pair 300 are conductive to common electrodes 402 on filter substrate pair through conductive particles 403.

Specifically, whether to dope a seal with conductive particles 403 depends on area of substrate disposed with common electrodes. Seal doped with conductive particles 403 is used for area disposed with common electrodes, and remaining area not disposed with common electrodes uses seal not doped with conductive particles. Because seal is independent and closed, when seal is doped with conductive particles 403, entire seal will be doped with conductive particles 403. To dope seal with conductive particles 403 selectively can save manufacture cost.

Step S104: cutting adjacent substrate pair and filter substrate pair along adjacent lines of first substrate and second substrate to form panel.

In the instant embodiment, adjacent line 305 serves as border between first substrate 303 and second substrate 304. After cutting along adjacent line 305 between first substrate 303 and second substrate 304, adjacent substrate pair 300 and filter substrate pair can be cut into desired size.

Figure 4:
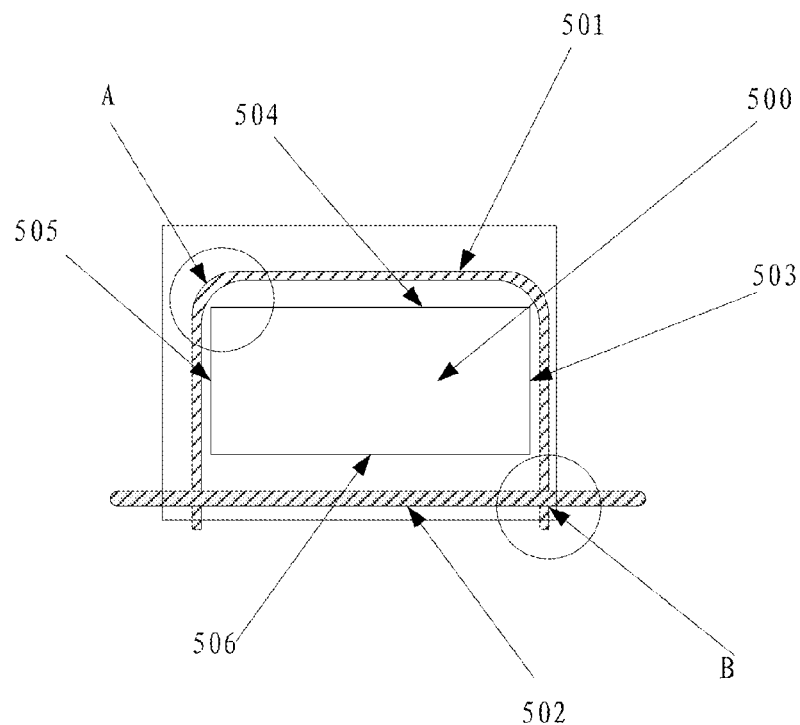
FIG. 4 is a schematic view showing the structure of a first embodiment of the panel according to the present invention.

After alignment and correction, adjacent substrate pair 300 and filter substrate pair are assembled into a panel shown in FIG. 4. The following describes panel of the present invention.

Figures 5A, 5B:
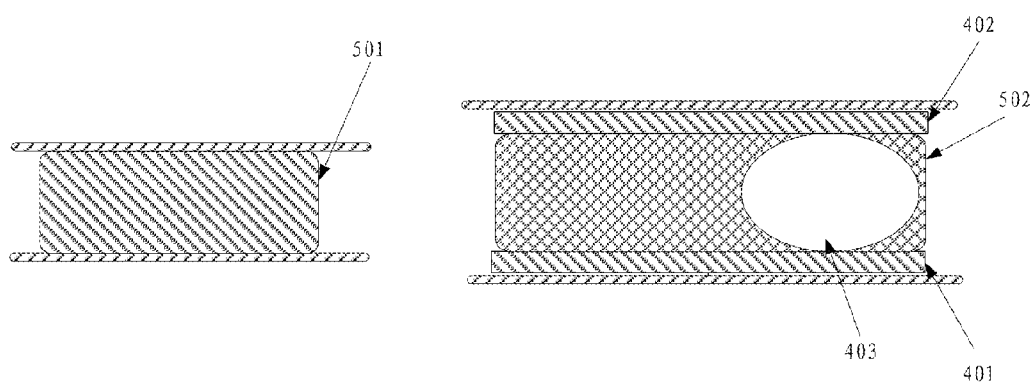
FIG. 5A is a partial cross-sectional view showing A area of the panel of FIG. 4.
FIG. 5B is a partial cross-sectional view showing B area of the panel of FIG. 4.

Refer to FIG. 4, FIG. 5A and FIG. 5B. FIG. 4 is a schematic view showing the structure of a first embodiment of the panel according to the present invention. FIG. 5A is a partial cross-sectional view showing A area of the panel of FIG. 4, and FIG. 5B is a partial cross-sectional view showing B area of the panel of FIG. 4. The panel comprises thin film transistor substrate 500, filter substrate, first seal part 501 and second seal part 502.

In the instant embodiment, thin film transistor substrate 500 is one of first substrate 303 or second substrate 304. Thin film transistor substrate 500 further comprises first side 503, second side 504, third side 505 and fourth side 506. Fourth side 506 of thin film transistor substrate 500 is disposed with common electrodes 401 on the border. Only second seal part 502 is doped with conductive particles 403, and second seal part 502 at least partially covers common electrodes 401.

Filter substrate is one of filter substrate pair. Filter substrate is disposed oppositely to thin film transistor substrate 500.

First seal part 501 is a part of first seal 301, and is coated on borders of first side 503, second side 504 and third side 505 of thin film transistor substrate 500.

Second seal part 502 is a part of second seal 302, and is coated on border of fourth side 506 of thin film transistor substrate 500. First seal part 501 and second seal part 502 are partially crossing and overlapping.

In the instant embodiment, fourth side 506 of thin film transistor substrate 500 is disposed with common electrodes 401. Second seal part 502 doped with conductive particles 403 is used to coat fourth side 506. First seal part 501 not doped with conductive particles 403 is used to coat first side 503, second side 504 and third side 505 of thin film transistor substrate 500. Signal conduction is accomplished through lower surface of conductive particles 403 contacting common electrodes 401 of thin film transistor substrate 500 and upper surface of conductive particles 403 contacting common electrodes 402 of filter substrate.

In the instant embodiment, common electrode area of panel are coated with second seal part 502 doped with conductive particles 403, and remaining area is coated with general seal not doped with conductive particles. This approach realizes two different types of seals on a same substrate and each of seals is closed. This approach also avoids the complex process of transfer pad and solves the problem of performing Au in sealant on common electrode area of a substrate while remaining area on the substrate using general seal.

Figures 6A, 6B:
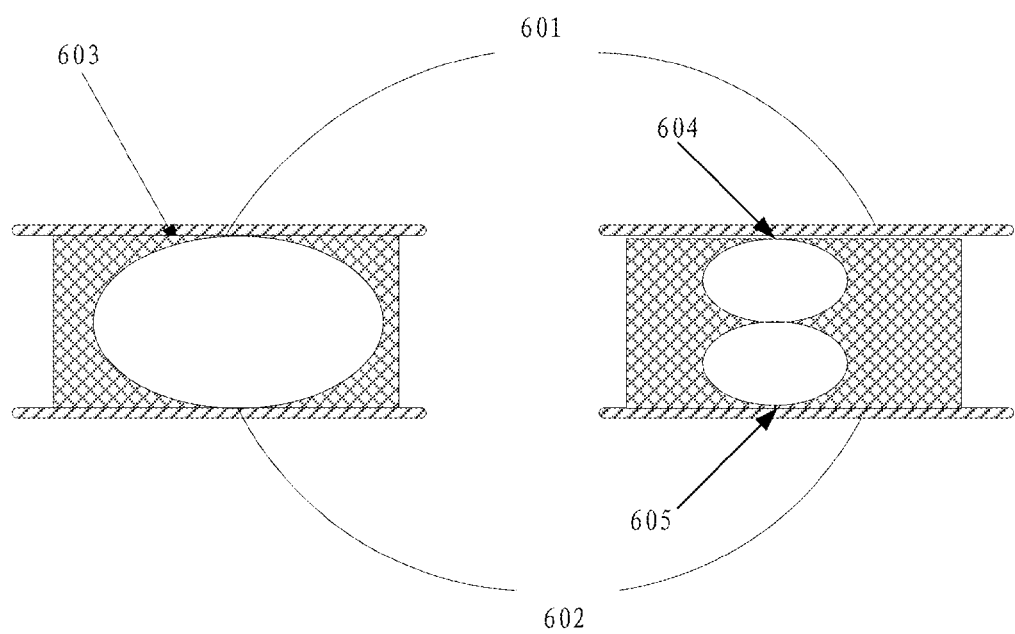
FIG. 6A and FIG. 6B are schematic views showing the structure of a second embodiment of the panel according to the present invention.

Referring to FIG. 6A and FIG. 6B, FIG. 6A and FIG. 6B are schematic views showing the structure of a second embodiment of the present invention. FIG. 6A and FIG. 6B show partial cross-sectional views of seal area doped with conductive particles on the panel respectively, including upper substrate 601 and lower substrate 602. Diameter of conductive particle 603 in FIG. 6A is larger than diameters of conductive particles 604, 605 of FIG. 6B.

Preferably, conductive particles 603, 604, 605 are gold particles (Au). In the present embodiment, diameter of conductive particle 603 is larger than diameters of conductive particles 604, 605. The sizes of conductive particles do not affect conductivity of conductive particles, as long as able to realize upper surface of conductive particles contacting common electrodes on upper substrate 601 and lower surface of conductive particles contacting common electrodes on lower substrate 602.

Furthermore, the number of conductive particles depends on the range of seal to be coated and conductive range to achieve conduction. Conductive particles can also be silver particles (Ag).

The present invention further provides an embodiment of a liquid crystal display device, which comprises the aforementioned panel.

To distinguish from the displaying characteristic of the known technique, the liquid crystal display device, panel and panel manufacture method of the present invention coat the common electrode area of adjacent substrate pair with a seal doped with conductive particles, and remaining area with general seal. Through adjacent substrate pair to realize sealing coating of the seal, the panel forms different seals on different sides after cutting. The seal doped with conductive particle of the panel of the present invention can conduct common electrodes of the upper and lower substrates, and remaining area other than common electrode is coated with a general seal without conductive particles.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the clams of the present invention.

What is claimed is:

1. A panel manufacture method, which comprises:
    completing thin film transistor array and common electrode on glass substrate, forming adjacent substrate pair, the adjacent substrate pair comprising a first substrate and a second substrate connected by adjacent lines, common electrodes on the first substrate and the second substrate being symmetrically distributed with respect to adjacent line;
    coating a first seal on peripheral area of adjacent substrate pair, coating a second seal along the adjacent sides of the first substrate and the second substrate, the second seal and the first seal being partially overlapping, at least one of the first seal and the second seal comprising conductive particles;
    boxing the adjacent substrate pair and filter substrate pair so that conductive particles conducting common electrodes of adjacent substrate pair and filter substrate pair; and
    cutting adjacent substrate pair and filter substrate pair along adjacent lines of first substrate and second substrate to form panel.

2. The method as claimed in claim 1, characterized in that: when the common electrode are disposed on adjacent sides of first substrate and second substrate, only second seal is doped with conductive particles and second seal at least partially covers common electrodes.

3. The method as claimed in claim 1, characterized in that: when the common electrodes are disposed on peripheral areas surrounding adjacent substrate pair, only the first seal is doped with conductive particles and first seal at least partially covers common electrodes.

4. The method as claimed in claim 1, characterized in that: the conductive particle is gold particle (Au).

5. The method as claimed in claim 4, characterized in that: number of conductive particles is plural and diameters of conductive particles are different.

6. The method as claimed in claim 4, characterized in that: width of the first seal is different width of the second seal.

7. A panel manufactured by the method as claimed in claim 1, which comprises:
   a thin film transistor substrate, being one of first substrate or second substrate;
   a filter substrate, being one of filter substrate pair;
   first seal part, a part of first seal, coating on borders of first, second and third sides of thin film transistor substrate;
   second seal part, a part of second seal, coating on border of fourth side of thin film transistor substrate, first seal part and second seal part being partially crossing and overlapping.

8. The panel as claimed in claim 7, characterized in that: border of the fourth side of thin film transistor substrate is disposed with common electrodes, only second seal part is doped with conductive particles and second seal part at least partially covers the common electrodes.

9. The panel as claimed in claim 7, characterized in that: borders of the first, second and third sides of thin film transistor substrate are disposed with common electrodes, only first seal part is doped with conductive particles and first seal part at least partially covers the common electrodes.

10. The panel as claimed in claim 8, characterized in that: the conductive particle is gold particle (Au).

11. The panel as claimed in claim 9, characterized in that: number of conductive particles is plural and diameters of conductive particles are different.

12. The panel as claimed in claim 9, characterized in that: width of the first seal is different width of the second seal.

13. A liquid crystal display device, which comprises:
    a thin film transistor substrate, being one of first substrate or second substrate;
    a filter substrate, being one of filter substrate pair;
    first seal part, a part of first seal, coating on borders of first, second and third sides of thin film transistor substrate;
    second seal part, a part of second seal, coating on border of fourth side of thin film transistor substrate, first seal part and second seal part being partially crossing and overlapping.

14. The liquid crystal display device as claimed in claim 13, characterized in that: border of the fourth side of thin film transistor substrate is disposed with common electrodes, only second seal part is doped with conductive particles and second seal part at least partially covers the common electrodes.

15. The liquid crystal display device as claimed in claim 13, characterized in that: borders of the first, second and third sides of thin film transistor substrate are disposed with common electrodes, only first seal part is doped with conductive particles and first seal part at least partially covers the common electrodes.

16. The liquid crystal display device as claimed in claim 14, characterized in that: the conductive particle is gold particle (Au).

17. The liquid crystal display device as claimed in claim 16, characterized in that: number of conductive particles is plural and diameters of conductive particles are different.

18. The liquid crystal display device as claimed in claim 16, characterized in that: width of the first seal is different width of the second seal.

* * * * *